(12) United States Patent
Levi et al.

(10) Patent No.: US 9,287,822 B2
(45) Date of Patent: Mar. 15, 2016

(54) PORTABLE POWER SYSTEM

(76) Inventors: Ofir Levi, Mazkeret Batya (IL); Eyal Levi, Ganey Yochanan (IL); Amnon Rogev, Rehovot (IL); Lior Levi, Ganey Yochanan (IL)

( * ) Notice: Subject to any disclaimer, the term of this patent is extended or adjusted under 35 U.S.C. 154(b) by 291 days.

(21) Appl. No.: 13/928,079

(22) PCT Filed: Dec. 6, 2011

(86) PCT No.: PCT/IL2011/000923
§ 371 (c)(1),
(2), (4) Date: Oct. 9, 2013

(87) PCT Pub. No.: WO2012/090191
PCT Pub. Date: Jul. 5, 2012

(65) Prior Publication Data
US 2014/0020731 A1 Jan. 23, 2014

(30) Foreign Application Priority Data
Dec. 28, 2010 (IL) .......................................... 210321

(51) Int. Cl.
*F24J 2/52* (2006.01)
*F24J 2/54* (2006.01)
(Continued)

(52) U.S. Cl.
CPC . *H02S 30/20* (2014.12); *F24J 1/00* (2013.01); *F24J 2/5232* (2013.01); *F24J 2/5264* (2013.01);
(Continued)

(58) Field of Classification Search
CPC ............ H02S 20/30; H02S 20/32; F24J 2/36; F24J 2002/5277; F24J 2002/529
See application file for complete search history.

(56) References Cited

U.S. PATENT DOCUMENTS 4,421,943 A 12/1983 Withjack
5,905,356 A * 5/1999 Wells ............................ 320/101
(Continued)

FOREIGN PATENT DOCUMENTS

WO 2009112719 9/2009
WO WO 2010079250 A1 * 7/2010

OTHER PUBLICATIONS

Definition of "hinge" [retrieved from internet at http://www.merriam-webster.com/dictionary/hinge on Jun. 8, 2015].*
(Continued)

*Primary Examiner* — Susan D Leong
*Assistant Examiner* — Eric R Smith
(74) *Attorney, Agent, or Firm* — Mark David Torche; Patwrite LLC

(57) ABSTRACT

A portable self-sustained power system including, a transportable platform, a plurality of solar array racking structures. The system includes a plurality of solar panels securely mounted upon said solar array racking structures thereby supporting the solar panels to form a plurality of planar solar arrays. The system further includes a plurality of hinge posts, each respectively connected near the corners of said transportable platform. The system further includes a plurality of solar array support frames, each of the solar array support frame vertically hinged to respective hinge posts, wherein the respective solar array support frame is capable of rotating at various angles around the vertical axis of the respective hinge post. The system further includes a plurality of horizontal hinges; each horizontal hinge rotatably interconnected between the solar arrays and the plurality support frames respectively, each respective hinge capable of rotatably positioning the respective solar array at various angles.

19 Claims, 8 Drawing Sheets

(51) Int. Cl.
  *H02S 30/20* (2014.01)
  *H01L 31/042* (2014.01)
  *H02S 10/40* (2014.01)
  *F24J 1/00* (2006.01)

(52) U.S. Cl.
  CPC ................ *H02S 10/40* (2014.12); *H02S 20/00* (2013.01); *F24J 2/542* (2013.01); *F24J 2002/5277* (2013.01); *F24J 2002/5281* (2013.01); *F24J 2002/5486* (2013.01); *Y02E 10/47* (2013.01); *Y02E 10/50* (2013.01)

(56) References Cited

U.S. PATENT DOCUMENTS

| | | | |
|---|---|---|---|
| 5,969,501 A | 10/1999 | Glidden et al. | |
| 7,469,541 B1 | 12/2008 | Melton et al. | |
| 7,531,741 B1 * | 5/2009 | Melton et al. | 136/246 |
| 7,795,837 B1 | 9/2010 | Haun et al. | |
| 2006/0260672 A1 * | 11/2006 | Niederer | 136/251 |
| 2007/0070531 A1 | 3/2007 | Lu | |
| 2008/0196758 A1 * | 8/2008 | McGuire | 136/245 |
| 2008/0314440 A1 | 12/2008 | Clemens et al. | |
| 2009/0079161 A1 | 3/2009 | Muchow et al. | |
| 2009/0188487 A1 * | 7/2009 | Jones et al. | 126/600 |
| 2010/0089433 A1 | 4/2010 | Conger | |
| 2010/0140949 A1 | 6/2010 | Pitre et al. | |
| 2010/0206354 A1 | 8/2010 | Greene, Jr. et al. | |
| 2010/0212659 A1 | 8/2010 | Carpoff | |
| 2011/0056146 A1 | 3/2011 | Appert | |
| 2011/0132353 A1 * | 6/2011 | Gumm et al. | 126/680 |
| 2011/0176256 A1 * | 7/2011 | Van Straten | 361/601 |
| 2012/0012157 A1 * | 1/2012 | Adell Argiles et al. | 136/248 |

OTHER PUBLICATIONS

Definition of "platform" [retrieved from internet at http://www.merriam-webster.com/dictionary/platform on Jun. 9, 2015].*

Definition of "jack" [retrieved from internet at http://www.merriam-webster.com/dictionary/jack on Jun. 9, 2015].*

* cited by examiner

PORTABLE POWER SYSTEM

CROSS REFERENCE TO RELATED APPLICATIONS

This application claims priority from patent application IL 210321, filed 28 Dec. 2010, entitled "Portable power system" and a national stage entry of International application PCT/IL2011/000923, entitled "Portable power system", filed on Dec. 6, 2011, the entire contents of which are incorporated herein by reference.

FIELD OF THE INVENTION

The present invention relates to portable power systems; particularly, to a self-sustaining portable power system for producing and distributing electrical power.

BACKGROUND OF THE INVENTION

A solar cell or photovoltaic cell is a solid state device that converts solar radiation energy directly into electrical energy by the photovoltaic effect. Assemblies of cells are used to construct solar modules, also known as solar panels, for the production of solar energy.

A solar panel (also termed photovoltaic module or photovoltaic panel) is a packaged interconnected assembly of solar cells. The solar panel can be used as a component of a larger photovoltaic system to generate and supply electricity in commercial and residential applications. Since a single solar panel can only produce a limited amount of power, an installation containing several panels, an array, is commonly required. A stand-alone photovoltaic installation typically includes an array of solar panels, a battery charge controller, an inverter, batteries and interconnection wiring.

Portable solar power systems that employ an array of solar panels to convert the radiant energy of sunlight directly into electrical energy are well known and are commonly used for generating electrical energy for all types of commercial, industrial and emergency applications. Such systems find particular use in remote locations and during emergency situations in which conventional electrical energy sources have been disrupted. Generally, such systems are clean to environment, silent and more economical than comparable diesel generators over the long term.

Portable solar power systems are disclosed for example in U.S. Pat. Nos. 4,421,943 and 5,969,501.

U.S. Pat. No. 4,421,943 discloses an apparatus for collecting solar energy and converting the solar energy to electrical energy utilizing solar panels pivotally mounted to a base such that the panels may be pivoted to a storage position inside the base. Additional solar panels may be pivotally mounted on retractable frame trays which stow inside the base when the panels are pivoted to horizontal position.

U.S. Pat. No. 5,969,501 discloses a trailer mounted, self-contained solar power system having a plurality of solar panel sections that are arranged to fold about the sides and top of the trailer. The panel sections unfold and lock together through slide rams that are contained within a rack structure supporting the panel sections to form a planer array that is easily deployable at a desired angle to the horizontal. The planer array pivots about a hinge along one side of the trailer top, and the panel sections are asymmetrically arranged so that positioning of the planar array can be easily accomplished.

Methods and systems for providing portable power supply using hybrid, renewable energy sources are known, for example, as disclosed in U.S. Pat. No. 7,469,541 and US patent application 2008/0196758.

U.S. Pat. No. 7,469,541 discloses a remote and portable hybrid power system comprising one or more of the following components: a solar system, batteries, a back-up generator, a wind energy system, and a communications system. The components are disposed on a platform that is portable and transportable to the remote location by a truck or other transportation vehicle.

US 2008/0196758 discloses a self-sustaining, portable power system that may be moved by land, air, or sea to an area that has no utilities. The system is provided with at least one wind turbine and/or solar panel arrays in communication with at least one electrical distribution and storage means. The derived electricity is used to power various systems including, albeit not limited to, a communications system, a water filtration system, a water distribution system to allow the public to draw portable water and provide basic hygiene. The electricity derived may also be used to run outside systems, such as schools, hospitals, or the like.

One of the objects of the present invention is to provide an improved portable power system.

SUMMARY OF THE INVENTION

The present invention relates to an improved portable power system; particularly, to a self-sustaining portable solar power system for producing and distributing electrical power, which can be used for example in all types of commercial, industrial, militarily and emergency applications.

In accordance with embodiments of one aspect of the present invention there is provided a portable self-sustained power system comprising: a transportable platform, a plurality of solar array racking structures, each having a rear portion and a front portion. The portable self-sustained power system further includes a plurality of solar panels, the solar panels being securely mounted upon the solar array racking structures, thereby supporting the solar panels to form a plurality of planar solar arrays. The portable self-sustained power system further includes a plurality of hinge posts, each respectively connected near the corners of the transportable platform. The portable self-sustained power system further includes a plurality of solar array support frames, each of the solar array support frames being vertically hinged to respective hinge posts, wherein the respective solar array support frame is capable of rotating at various angles around the vertical axis of the respective hinge post.

The portable self-sustained power system further includes a plurality of horizontal hinges, each horizontal hinge rotatably interconnected between the solar arrays and the plurality support frames respectively, each respective hinge capable of rotatably positioning the respective solar array at various angles. One or more electrical components are used for receiving and processing in a deployment position the electric energy generated by the plurality of solar arrays, and the electric energy processed by the at least one electrical component used for distributing electrical power to at least one external receptacle, In order to store the self-sustained power system in a storage position, each of the solar arrays is rotated to a vertical position and is secured to the side of the respective solar array support frames, and each of the respective solar array support frames is rotated toward its respective longitudinal side of the transportable plane platform and is secured thereto for transportation.

In order to deploy the self-sustained power system to the deployment position for collecting solar energy, each of the respective solar array support frames is vertically rotated and secured to a predetermined angle; then each of said respective solar arrays is horizontally rotated and secured to a predetermined angle.

In accordance with another aspect of the present invention there is provided a method for deploying a portable self-sustained power system to a deployment position and restoring the portable self-sustained power system to a storage position. The method comprises: providing a transportable platform; providing a plurality of solar array racking structures, each having a rear portion and a front portion; providing a plurality of solar panels. The solar panels are securely mounted upon the solar array racking structures, thereby supporting the solar panels to form plurality of planar solar arrays. A plurality of hinge posts is provided, each respectively connected near the corners of the transportable platform.

A plurality of solar array support frames is provided, each of the solar array support frames being vertically hinged to respective hinge post, wherein the respective solar array support frame is capable of rotating at various angles around the vertical axis of the respective hinge post. A plurality of horizontal hinges is provided; each horizontal hinge rotatably interconnected between the solar arrays and the plurality of support frames respectively, each respective hinge capable of rotatably positioning the respective solar array at various angles. At least one electrical component is provided for receiving and processing in the deployment position electric energy generated by the plurality of solar arrays, and the electric energy is processed by the at least one electrical component for distributing electrical power to at least one external receptacle.

Restoring the system to its storage position comprises the steps of: rotating each of said solar arrays to a vertical position; securing the arrays to the side of its respective solar array support frame; rotating each of the respective solar array support frames toward the respective longitudinal side of the transportable plane platform; and securing them for transportation.

Deploying the system in the deployment position comprises the steps of: unsecuring each of said respective solar array support frames and vertically rotating them to a predetermine angle, and unsecuring each of said respective solar arrays and horizontally rotating them to a predetermine angle.

One benefit of the present invention includes the deployment of the solar arrays of the portable power system, wherein the total area of the deployed solar array is large thereby providing a high level of electric power relative to other portable power systems.

Another benefit of the present invention occurs in situations where the portable electric power system needs to be transported to another location. In such situations, the solar arrays can be folded in a particular configuration to a restorable position such that the size of the power system after being folded can be less than or equal to a standard freight container which can be mounted on a track, trailer or other suitable vehicle. For example, a portable power system folded in a restorable position and implemented in accordance with some embodiments of the present invention may have dimensions of 6 meters length, 2.5 meters width and 2.7 meters high.

Another benefit of the present invention lies in the relative simplicity of changing from the deployment position to the storage position and vice versa, thus enabling relatively fast loading and unloading of the portable power system.

BRIEF DESCRIPTION OF THE DRAWINGS

The invention may be understood upon reading the following detailed description of non-limiting exemplary embodiments thereof, with reference to the following drawings, in which.

Figure 1:
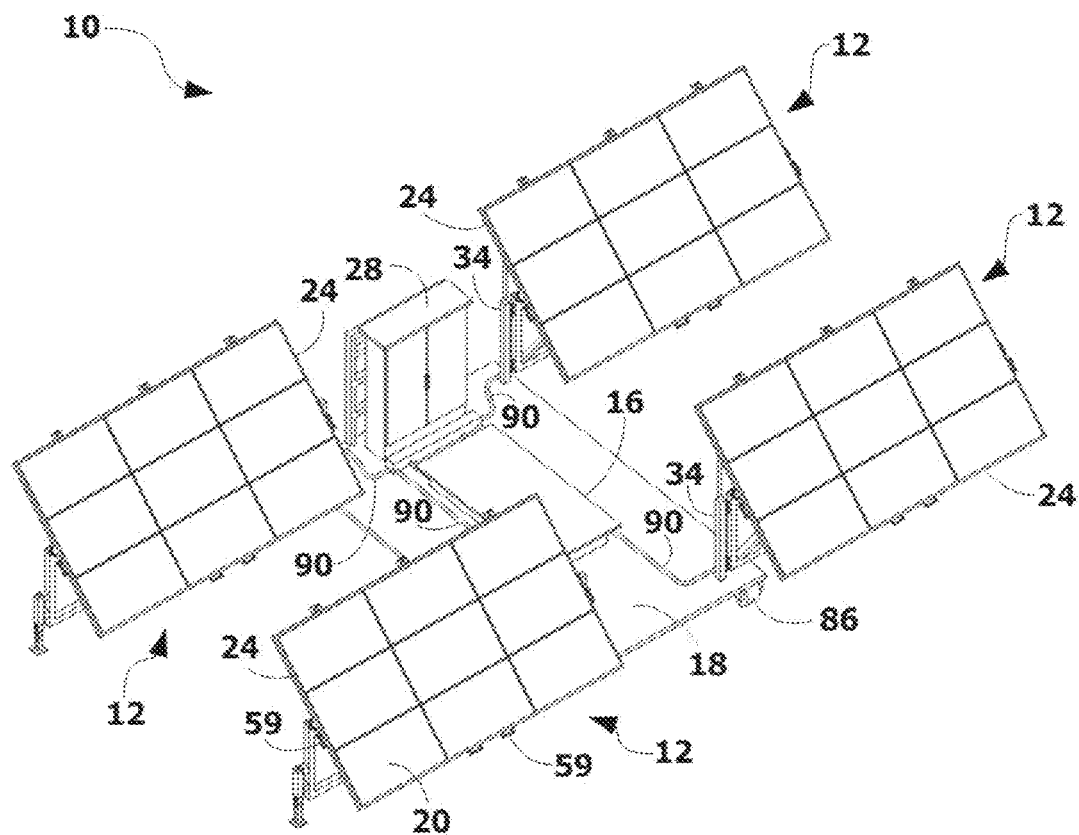
FIG. 1 is a perspective front view of a self-sustaining portable solar power system according to one embodiment of the present invention arranged in deployment position.

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

Referring first to FIGS. 1-4 there is shown a portable self-sustained power system 10 in accordance with an embodiment of the present invention including one or more of the following components: a radiant energy collecting means such as but not limited to a plurality of solar arrays 12 for collecting and converting radiant energy directly into electrical energy. An energy storage device for storing electrical energy such as but not limited to array of batteries thereby storing the energy received from the sunlight collecting means. The preferred batteries are industrial grade, deep-cycle, maintenance free, gel-cell batteries that do not need to be checked and do not need additional water added over their life. The size of such a battery and the number of batteries will depend upon the reserve power necessary for night use or for days used when clouds obscure the sun. The array of batteries is preferably enclosed in a cool box batteries enclosure 16. The cool box batteries enclosure 16 keeps the batteries within a set temperature range. The cool box batteries enclosure 16 removes heat away from the batteries through air vents (not shown) thereby extending the battery life. In some embodiments of the present invention the energy collected from solar array 12 can be provided to power load apparatuses directly.

One or more of the aforementioned components are disposed on a transportable plane platform 18 that is transportable to various locations, including vehicles that travel by land, water, or air. The transportable plane platform 18, is preferably made of steel or other structural material. It is important for the platform to have substantial weight so that the wind does not blow the assembly over after the platform has been positioned.

Solar arrays 12 include solar panels (for example solar panel 20) of interconnected assembly of solar cells (not shown). Each solar panel 20 may be made up of a plurality of individual cells (not shown), preferably having high efficiency, of crystalline silicon cells arranged in columns and rows to form modular solar panels 20. The solar panels 20 are securely mounted upon solar array racking structures 24 thereby supporting the solar panels to form a plurality of planar solar arrays 12. Each solar array racking structure 24 has a rear portion and a front portion.

In some embodiments of the present invention, solar arrays 12 include concentrating photovoltaic (CPV) systems which typically include lenses or mirrors to concentrate sunlight onto solar cells. These solar arrays 12 are typically more expensive than conventional arrays used for flat-plate photovoltaic systems. However, the concentration decreases the required cell area while also increasing the cell efficiency.

In accordance with some embodiments of the present invention, portable self-sustained power system 10 further includes a plurality of rotation bars, such as bars 30 (referring also to FIG. 4), each bar rotatably connected along the rear longitudinal portion of the respective solar array racking structure 24. Each bar is capable of rotatably positioning the respective solar array 12 at various angles around horizontal axis 32. It should be noted that bars 30 can be formed in various shapes, for example bars that have a cylindrical shape or square shape.

The portable self-sustained power system 10 further includes a plurality of substantially vertical hinge posts 34, respectively connected to the transportable platform 18 near the corners thereof. The portable self-sustained power system 10 further includes a plurality of solar array support frames 36 each of the solar array support frames being longitudinally connected to a respective rotation bar 30. The rotation capability of bar 30 is employed for example by positioning one or more horizontal hinges 38 along bar 30. Each horizontal hinge 38 is interconnected respectively between bars 30 with the upper portion of solar array support frames 36. As illustrated for example in FIG. 4 the solar array racking structures 24 are tilted to an angle that provides optimum interception of incident solar radiation by pivoting the solar panels 20 about horizontal hinge 38.

Solar array 12 is secured at an angle to the horizontal for example by an array tilt support 40. The bottom portion of array tilt support 40 has a horizontal hinge 41 and supports frame 36. The upper portion of array tilt support 40 includes a hole which fits into a plurality of spaced apart protruding elements 42 extending from the side of racking structure 24. The angle of solar array 12 can be secured by tilting the array 12 and aligning one of the holes of array tilt support 40 to the appropriate protruding element 42. Many other available and suitable methods can be used to rotate the respective solar array 12 at various angles around the horizontal axis and secured at a predetermine angle for example, instead of bar 30 one or more hinges can be interconnected respectively solar arrays, 12 and the upper portion of solar array support frames 36.

Each of the solar array support frames 36 is also vertically hinged to a respective hinge post 34. The solar array support frames 36 are capable of rotating at various angles around the vertical axis of their respective hinge posts 34. Hinge post 34 includes one or more hinges 44, preferably a pair of hinges in a vertical direction for holding racking structure support 24 and capable of turning around a vertical axis. Preferably, hinges 44 are positioned at upper and lower positions of the hinge post 34, wherein the positions are symmetrical about the horizontal plane which divides the hinge post 34 into equal halves. Each hinge 44 comprises a first plate and a second plate (not shown), the rear ends of which are connected with each other capable of rotation forming a hinged structure as known in the prior art. The first plate is attached to hinge 44 and the second plate is attached to an edge portion of the solar array support frame 36. Preferably, the rear end of the hinged post 34 includes a base (not illustrated) which is fixed to platform 18 by a fixing means such as but not limited to soldering, screws or nails.

Portable self-sustained power system 10 further includes one or more electrical components for receiving and processing electricity generated by the plurality of solar arrays 12. The electricity processed by the electrical component(s) distributes electrical power to one or more external receptacles, such as but not limited to an electrical lightning system or a water desalination system. Preferably, the electrical components are housed within an electronics cabinet 28 positioned on transportable platform 18 and fastened thereto.

Figure 2:
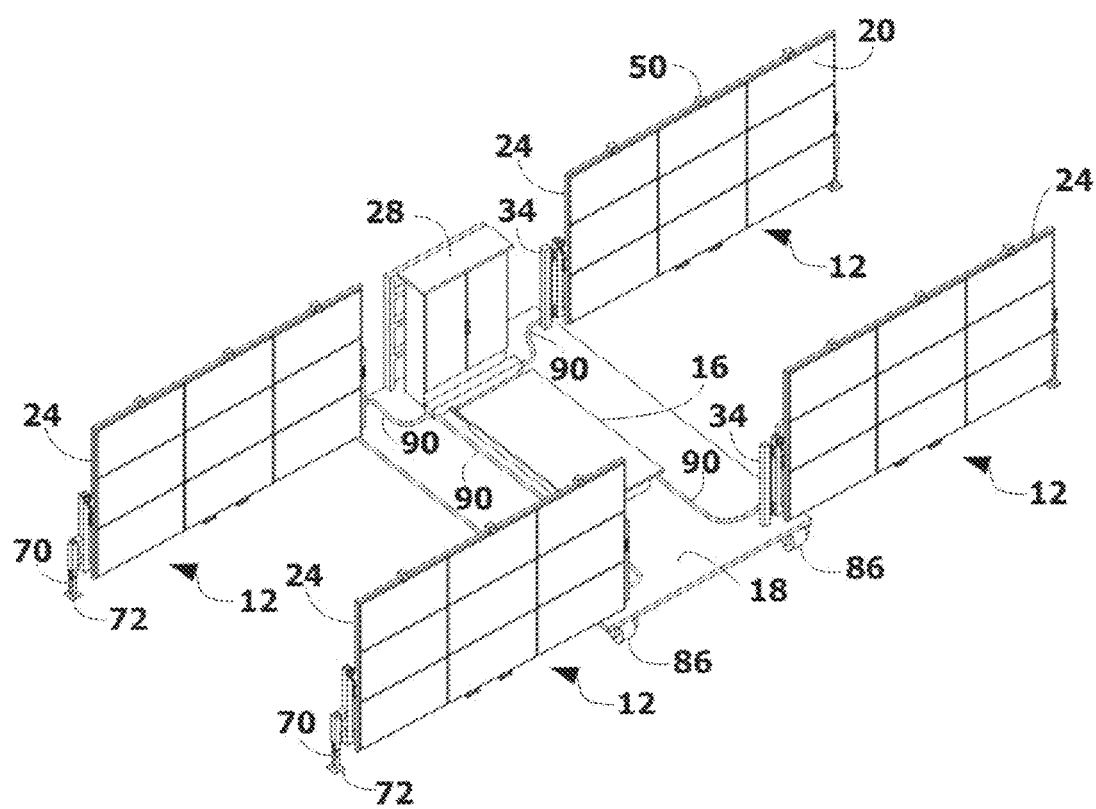
FIG. 2 is a perspective front view of the self-sustaining portable solar power system with its solar arrays tilted to a vertical position.
Figure 3:
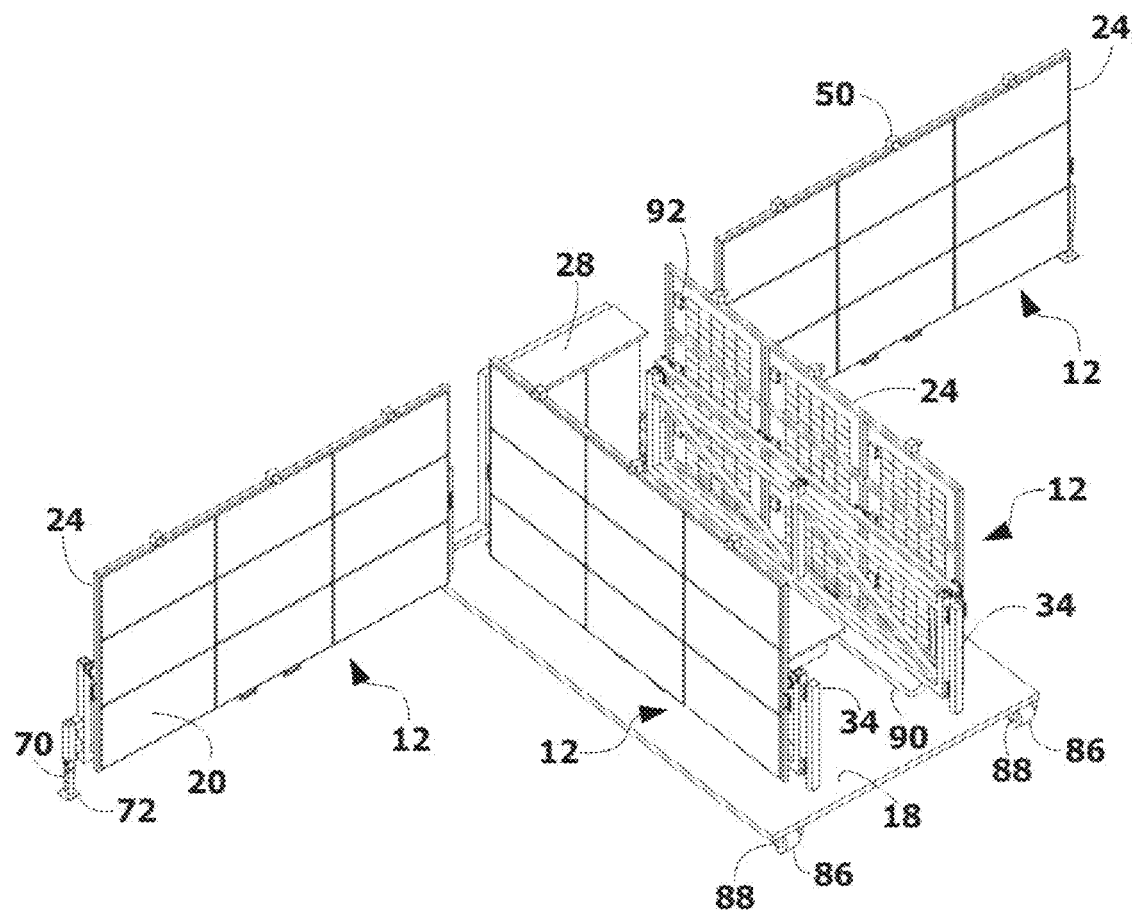
FIG. 3 is a perspective front view of the self-sustaining portable solar power system with its solar arrays tilted to a vertical position and two of the four solar frames folded towards the platform longitude side.
Figure 4:
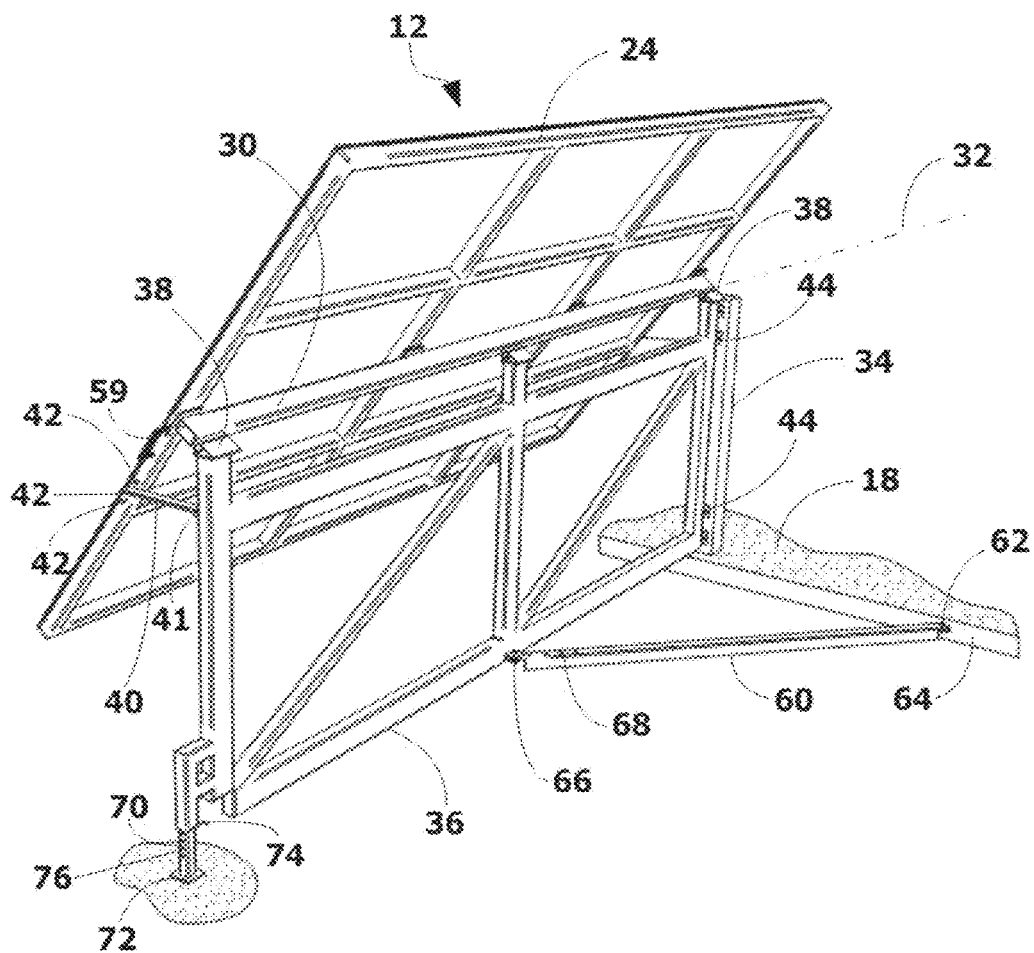
FIG. 4 is an enlarged rear view of a portion of the self-sustaining portable solar power system in accordance with one embodiment of the present invention.
Figure 6:
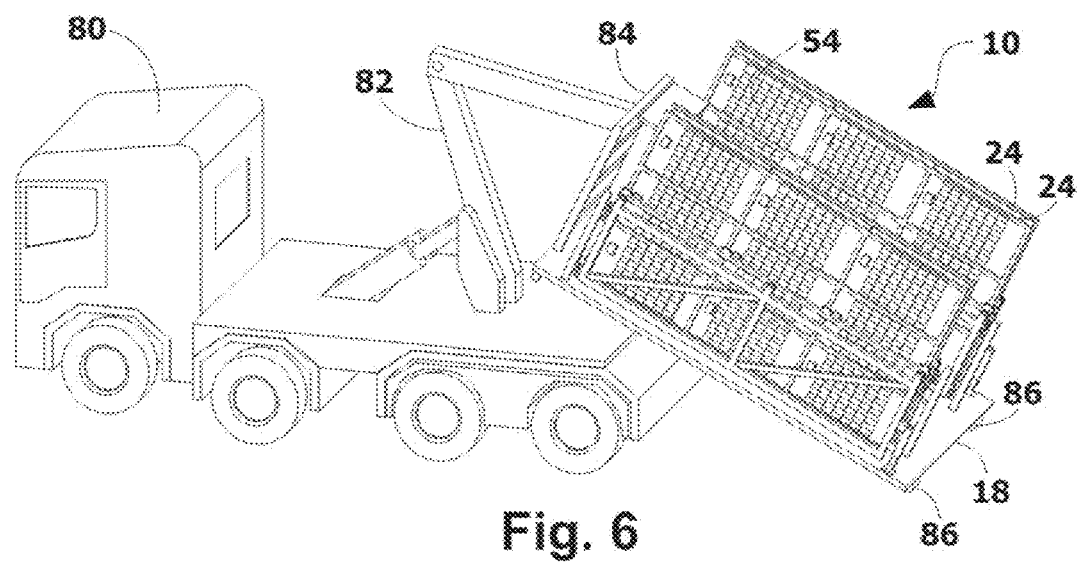
FIG. 6 is a perspective view illustrating one embodiment for lifting and lowering the self-sustaining portable solar power system.

Referring to FIG. 2 and FIG. 4, in order to store the self-sustained power system 10 in a storage position, each of solar arrays 12 is rotated to a vertical position as shown and is secured to the side of its respective solar array support frames 36, for example by, utilizing array tilt support 40. Referring now also to FIG. 3 and FIG. 6, after solar arrays 12 are rotated to a vertical position, each of the respective solar array support frames 36 is rotated toward the respective longitudinal side of transportable plane platform 18 and secured thereto for lifting the portable self-sustained power system 10 on a suitable vehicle for transportation. In the storage position, at each longitude side of platform 18, a pair of arrays 12, vertically overlie one another. Preferably, in order to protect solar panels 20 of solar arrays 12 from being damaged, the solar panels overlie each other, as shown for example in FIG. 6.

In some embodiments of the present invention, racking structure 24 includes a plurality of shock absorbers, such as shock absorber 50 to smooth out or damp shock impulse, and dissipate kinetic energy that may occur between each pair of arrays during transportation of solar power system 10. In some embodiments of the present invention, shock absorbers 50 are also positioned on the array support frame 36 to smooth out or damp shock impulse, and dissipate kinetic energy that may occur between support frame 36 and array 12 during transportation of solar power system 10.

Referring to FIG. 6, frameworks of spaced bars 54 parallel to or crossing each other are secured to the rear portions of solar array racking structures 24. The functionality of the frameworks of spaced bars 54 is to protect the wiring (not shown) of the solar arrays 12 and the solar arrays themselves, from accidently damage, particularly during transportation of solar power system 10.

In order to deploy the self-sustained power system 10 to a deployment position for example, as shown in FIG. 1, each of the respective solar array support frame unsecured from the side platform 18. Afterwards, each of the respective solar array support frame 36 is rotated and secured to a predetermine angle. Each of the respective solar arrays unsecured from vertical position and afterwards, is horizontally tilted and secured to a predetermine angle. It is estimated that one adult male of average strength can easily deploy or fold solar arrays 12 and array support frames 36 for example by using a grabbing means such as handles 59.

Referring again to FIG. 4, according to one embodiment of the present invention a diagonal support bar 60 is employed for securing array support frame 36 to a predetermine angle. Each diagonal support bar 60 is hinged in one end 62 to the respective platform side 64, and hinged at the other end 66 to lower portion of solar array support frame 36. Diagonal support bar 60 includes a plurality of holes 68 along bar 60. The hole 68 is pivotally hinged to array support frame 36 determines the secured angle. Many other available and suitable methods can be used to secure to array support frame 36 at a desired angle. Also illustrated in FIG. 4 are certain features that enhance the performance of the solar power system under adverse conditions. Wind striking against the large surface area of the deployed solar panels 20 can create large tipping forces. Under these circumstances, the power system can be braced against tipping forces by providing stabilizing jacks 70 at each respective array support frame 36 corner.

Each jack 70 has a base 72 that is raised up or lowered down through a screw turned by crank 74 to adjust to uneven terrain. Base 72 of stabilizing jacks 70 may rise up or lowered down with optional incorporation of pneumatic, hydraulic or electrical means operated directly or remotely by, switches, buttons, stick or any other suitable means. In another option, Jacks 70 may mounted on telescopic support members. Jacks 70 have an inner leg and an outer leg that are provided with a plurality of holes 76 along at least a portion of their lengths, and the holes are placed so that holes within the inner leg can be aligned with respect to those in the outer leg. A removable pin is then inserted through a set of aligned holes 76 to fix the position of inner leg relative to that of the outer leg, and thus establish the length of jack 70.

Platform 18 includes a rear wheel assembly 86 for supporting the platform for movement over terrain. Wheel assembly 86 can comprise, a cylindrical roller mounted near the rear end of platform 18. The roller is free to rotate on its lateral axis. The roller is installed by inserting a shaft in each end of the roller, the shaft being connected to mounting plates 88. Each plate is then attached to the bottom portion of platform 18. When installed, a lower portion of the outer surface of the roller is positioned to the lowest point on platform 18 when the platform is in an inclined position. The roller contacts a support surface, preventing damage to power system 10.

Wiring raceways 90 support wiring harnesses which originate for example from the photovoltaic panels 20 to a junction box 92 of solar panel 20, battery box enclosure 16 and electronics cabinet 28. It should be understood that the term "wiring" is used in its generic sense and is intended to include single and multiconductor cables and conductors of all types, whether insulated or uninsulated. It is further understood that the term "wiring raceway" is also used in its generic sense and is intended to include, by way of example, cable trays whether enclosed in whole or part.

In some embodiments of the present invention solar power system 10 includes a solar tracking system for automatically tracks the sun by a motorized tracking subsystem thereby at least one of the solar arrays moves in direction of the sun so that more energy is produced by system 10.

In some embodiments of the present invention, solar power system 10 may also include a suitable backup-generator as known in the art (not shown), and/or a wind energy system (not shown). The wind energy system comprises conventional wind energy machines, known in the art, such as propeller windmill (not shown), wind turbine (not shown) and the like. The wind energy system is preferably mounted on platform 18. The wind energy system and the backup-generator are particularly useful for providing supplemental power at night and on cloudy or windy days. The energy produced from the wind energy system is transferred to a collecting means, preferably an array of batteries for storing electrical energy and supplying this energy to an external receptacle.

Figure 5:
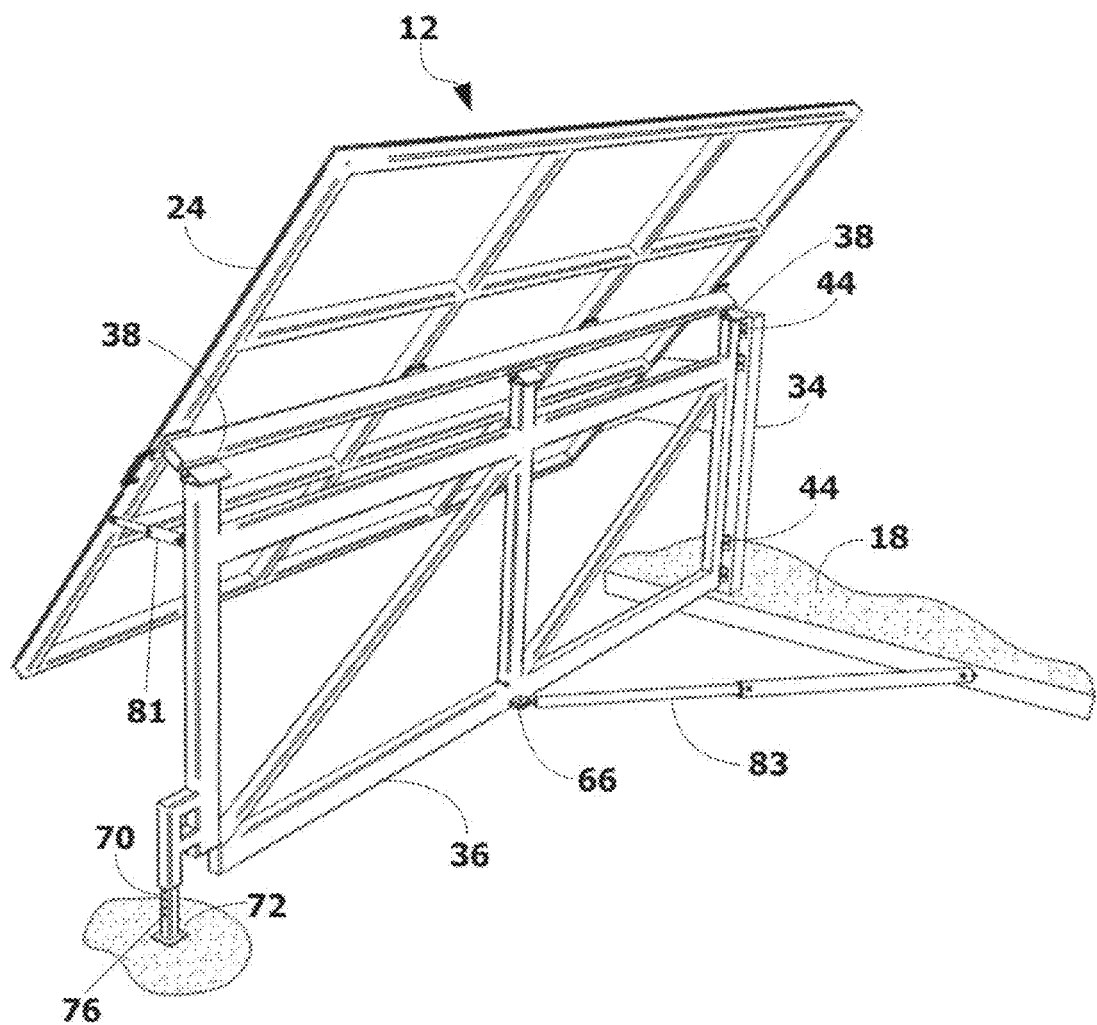
FIG. 5 is an enlarged rear view of a portion of the self-sustaining portable solar power system in accordance with another embodiment of the present invention.

In some embodiments of the present invention solar arrays 12 and array support frames 36 can be rotatable automatically with optional incorporation of pneumatic, hydraulic or electrical means operated directly or remotely by, switches, buttons, stick or any other suitable means. FIG. 5 shows an exemplary embodiment of hydraulic means including hydraulic arms 81 and 83 designed to tilt solar array 12 to various angles and rotate array support frames 36 to various angles, respectively. The hydraulic means further includes at least one power source (not shown) such as a hydraulic pump (not shown) automatically controlled by a controller (not shown). In some embodiments of the present invention stabilizing jacks 70 are raised and lowered remotely with incorporation of pneumatic, hydraulic or electrical means, (not shown).

Figure 7:
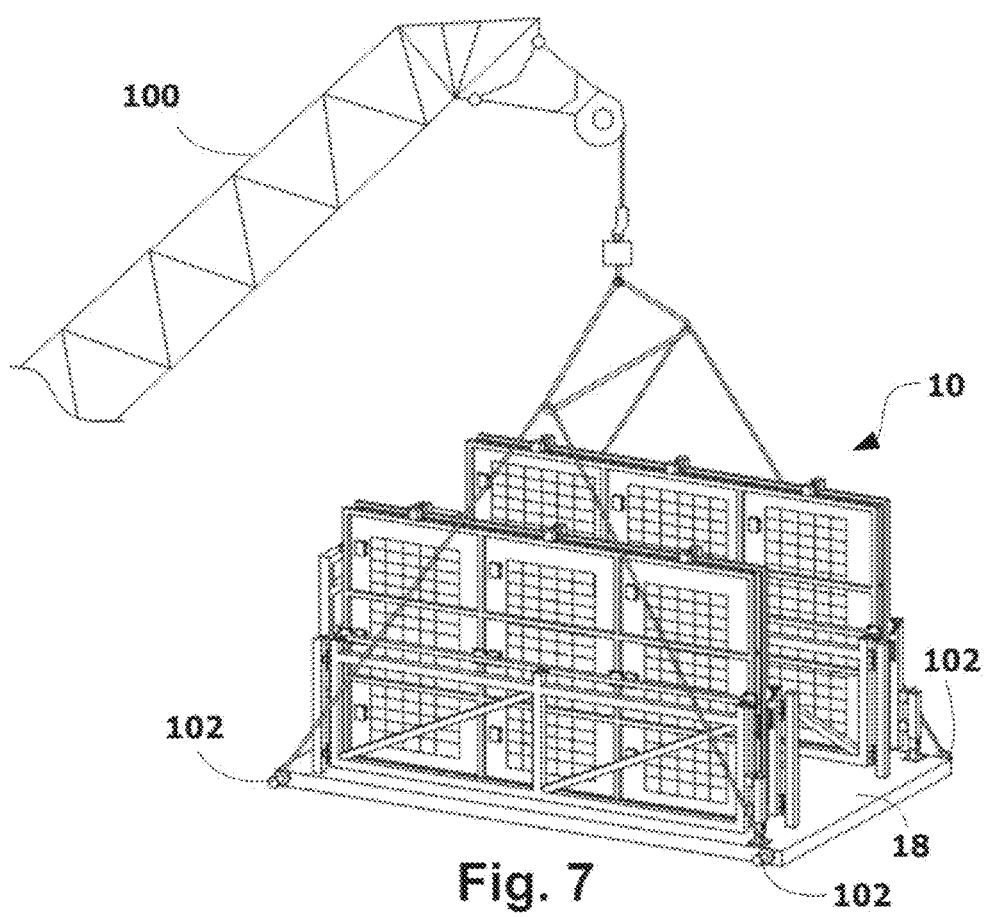
FIG. 7 is a perspective view illustrating another embodiment for lifting and lowering the self-sustaining portable solar power system.
Figure 8:
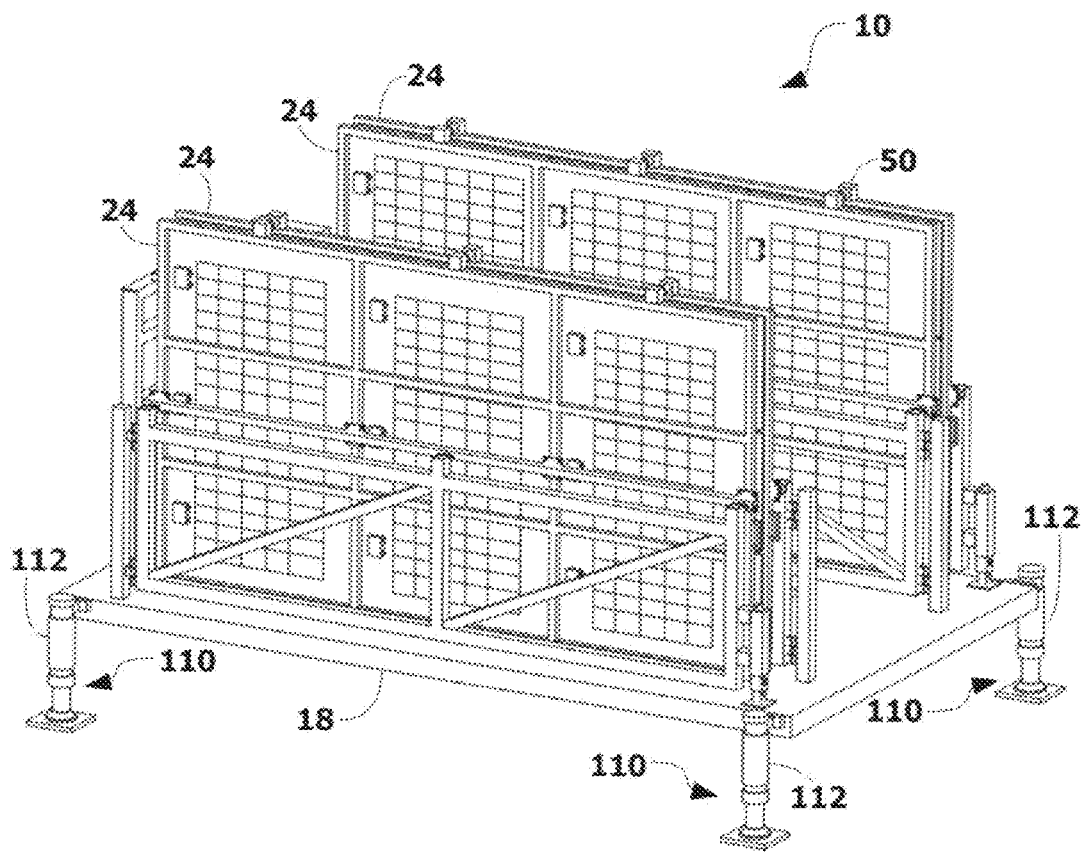
FIG. 8 is another embodiment for lifting and lowering the self-sustaining portable solar power system.

Referring now to FIGS. 6-8 there is shown exemplary embodiments for lifting and lowering a folded solar power system 10.

FIG. 6 shows a truck 80 and hook hoist 82 combination for picking up and manipulating the folded solar power system 10 having a grasping ring (not shown) attached at the rear portion of a frame member 84. Transportable platform 18 can be mounted on a suitable vehicle such as truck 80 or a trailer and then slid into position at the deployment location. If system 10 needs to be moved after being delivered, a truck winch or tractor can slide the platform 18 around to another location. Alternatively, platform 18 can remain on the trailer, for movement at a later time.

FIG. 7 shows another embodiment for respectively lifting and lowering solar power station 10 from/on a suitable vehicle respectively. A conventional hook-lift vehicle (not illustrated) having a standard hydraulically-operated lifting mechanism (not illustrated) including a lift hook 100 can be used. Engage platform members 102 are located for example on each corner of transportable platform 18 for the proposes of securing the platform during transport and as a connection point for cranes to hoist or elevate the solar power station from a staging area to carrier or from one carrier to another carrier.

FIG. 8 shows another embodiment for lifting and lowering solar power station on/from a suitable vehicle. The solar power system 10 is supported on a conventional flatbed vehicle or trailer, (not shown). A lift system employing one or more lift assemblies 110, by applying one or more embodiments described herein solar power system 10 can be raised or lowered to a suitable height under which a flat bed, (not shown) may fit. These embodiments are designed so that one person may use it to lift and load or unload the solar power system 10 on a flatbed vehicle, trailer chassis or the like without any additional equipment.

Lift assemblies 110 are connected to transportable platform 18 of the solar power system 10. Lift assemblies 110 can be in a lowered position and in a raised position. The lift system includes at least one lift assembly 110 and optionally further include at least one power source (not shown) such as a hydraulic pump (not shown). The lift system is shaped and sized to confirm to a section of the solar power system. For example, FIG. 8 illustrates an exemplary lifting assembly 110 attached to a corner of platform 18. The lifting system can be activated to raise the solar power system 10. The lifting system can include hydraulic jacks 112, which can be further connected to a hydraulic pump (not shown) which is then used to produce hydraulic pressure to raise the solar power system 10.

Various schemes can be used to assure that the solar power system 10 is raised evenly at the four corners of the platform 18. One scheme involves using a separate hydraulic valve for each of the four lifting assemblies 110 where a person would be responsible to keep the solar power station 10 level as it is lifted or lowered. Another scheme is to use a device such as an accelerometer or other like device (not shown), that may be attached to the solar power system 10 and would indicate to a computer or controller (not shown) the level state of the solar power system and cause it to make adjustments accordingly to each lifting assembly 110.

EXAMPLE

A portable self-sustained power system was constructed in accordance with one embodiment of the present invention. The system included four solar arrays 12 each formed by nine photovoltaic (solar) panels 20, arranged in three rows and three columns. The dimensions of each panel were 1.6 meters length by 0.8 meter width. Each photovoltaic panel 20 provides approximately 225 Watts such that the total power of the arrays 12 was approximately 8,000 Watts. The electronic cabinet 28 housed a 10,000 Watt charge controller, a 10,000 Watt off-grid inverter, a monitoring system and a communications system. The battery box enclosure 16 housed lead-acid deep cycle gel batteries of total capacity of 2,500 Ampere-Hour at 12 Volts.

The portable self-sustained power system 10 supplied two voltage output options: 230 AC voltage/50 hertz and 24 DC voltage power source. The portable self-sustained power system 10 delivered approximately up to 10,000 Watts by demand, and was designed to supply approximately 1,000 Watts power for 24 hours/7 days continuously and independently in varied weather condition.

The dimensions of the portable self-sustained power system 10 in a storage position were approximately: 6 meters length, 2.5 meters width and 2.7 meters high which is approximately size of standard freight container. The platform 18 have an area of 6 meters length and 2.5 meters width carry the aforementioned components. The dimensions of the portable self-sustained power system 10 in the deployable position were 13 meters length and 6 meters width.

Optionally, a backup diesel generator of 5,000 Volt-Ampere was included on the platform 18 to enhance the system power delivery capabilities.

Figures 9A, 9B:
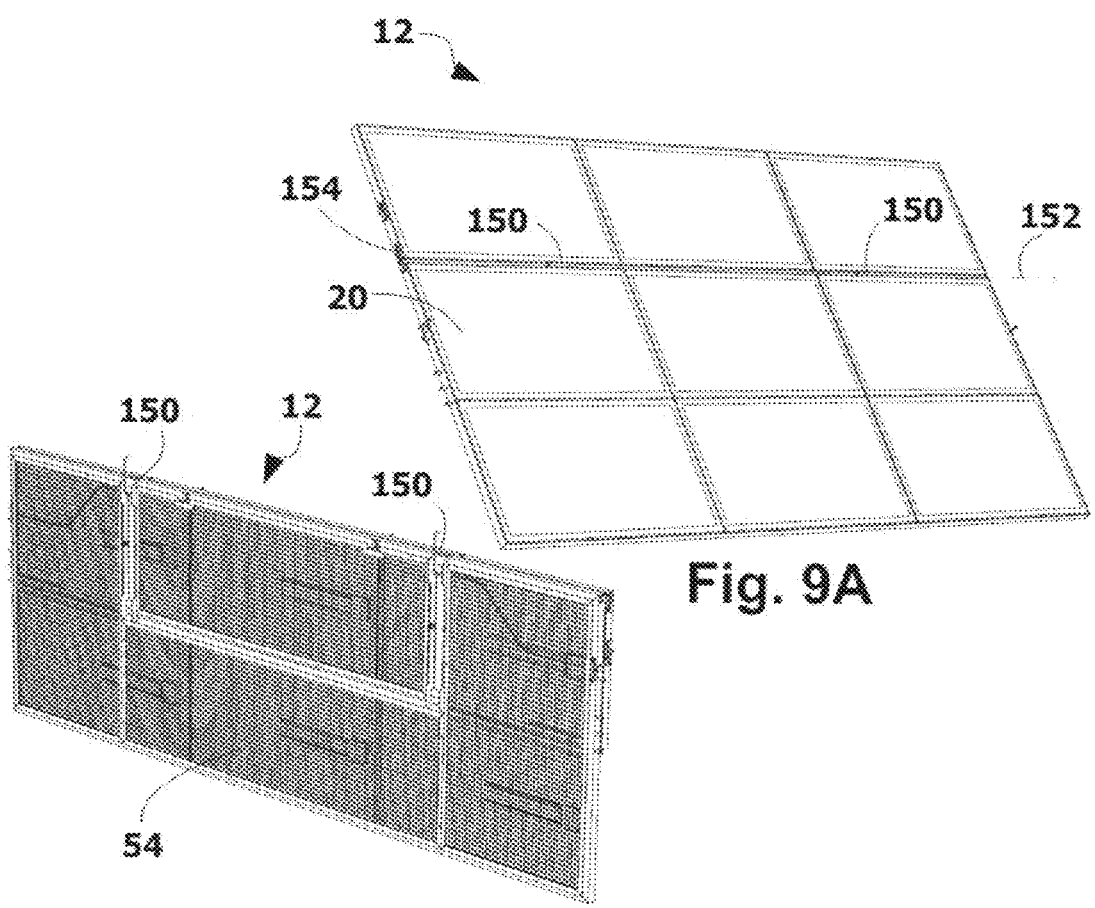
FIG. 9A is a perspective front view of a racking structure in accordance with some embodiments of the present invention having one or more hinges to allow the racking structure horizontally fold around the horizontal axis of the hinge(s); and, FIG. 9B is a perspective rear view of the racking structure shown in FIG. 9A in which the upper most row of the solar array is folded around the horizontal axis of the hinge(s).

Referring now to FIGS. 9A and 9B, in some embodiments of the present invention racking structure 24 can be horizontally foldable. Racking structure 24 may include one or more horizontal hinges 150. Preferably, hinges 150 are positioned at the lower portion of the uppermost row of solar array 12. As can be seen in FIG. 9B when raking structure 24 is in a close position the upper most row of solar array 12 is folded around the horizontal axis 152 of hinges 150 such that the front side of the uppermost row of solar array 12 meets with the front side of one or more row panels beneath. When racking structure 24 in an open position, racking structure may include a locking means 154 to prevent racking structure to be folded back to close position. The locking means is unlocked when a user wants to fold racking structure 24 as described above.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A portable power system comprising:
   a transportable platform;
   a plurality of solar array racking structures, each having a rear portion and a front portion;
   a plurality of solar panels, said solar panels securely mounted upon said solar array racking structures thereby supporting said solar panels to form a plurality of planar solar arrays;
   a plurality of substantially vertical, free-standing hinge posts, each respectively connected near the corners of said transportable platform;
   a plurality of solar array support frames, each of said solar array support frames vertically hinged to respective hinge posts, wherein said respective solar array support frames are configured to be rotatable to various angles around the vertical axis of said respective hinge posts;
   a plurality of horizontal hinges, each horizontal hinge rotatably interconnected between said solar arrays and said plurality of solar array support frames respectively, each respective hinge capable of rotatably positioning said respective solar array at various angles; and
   at least one electrical component for receiving and processing in a deployed position said electric energy generated by said plurality of solar arrays, said electric energy processed by said at least one electrical component for distributing electrical power to at least one external receptacle, wherein, in order to store the power system to a storage position, each of said solar arrays is rotated to a vertical position about said horizontal hinges, each of said respective solar array support frames is rotated about the vertical axis of their respective hinge post toward the transportable platform and is secured thereto for transportation; and in order to deploy said power system to the deployed position for collecting solar energy, each of said respective solar array support frames is vertically rotated and secured to a desired angle, then each of said respective solar arrays is horizontally rotated and secured to a desired angle.

2. The system according to claim 1, further comprising an energy storage device for storing electrical energy received from said solar arrays.

3. The system according to claim 2, further comprising at least one wind turbine positioned and storable on said transportable platform; and means for positioning said wind turbine from a storage position to a windward collecting position, said wind turbine adapted to provide energy to said energy storage device.

4. The system according to claim 1, further comprising a plurality of rotation bars, each bar rotatably connected along the rear portion of the respective solar array racking structures, each of said solar array support frames being longitudinally connected to the respective rotation bar, each of said hinges respectively interconnected between said bars and the upper portion of said plurality of solar array support frames and each of said bars is capable of rotatably positioning said respective solar arrays at various angles.

5. The system according to claim 1, further comprising at least one electrical component for generating AC voltage.

6. The system according to claim 1, further comprising a grasping ring for picking up said portable power system via a truck; and a hook hoist combination.

7. The system according to claim 1, wherein said transportable platform further comprises a plurality of rear rollers assembly mounted near the rear end of said transportable platform for supporting the platform for movement over terrain and preventing damage to the power system.

8. The system according to claim 1, wherein said solar array racking structures further comprise a plurality of shock absorbers.

9. The system according to claim 1, wherein in the deployed position, at least one of said plurality of solar arrays automatically tracks the sun by a motorized tracking subsystem whereby at least one of said solar arrays moves in the direction of the sun so that more energy is produced by said system.

10. The system according to claim 1, further comprising a stabilizing jack at each corner of said transportable platform.

11. The system according to claim 10 wherein, said stabilizing jacks are raised and lowered remotely with incorporation of pneumatic, hydraulic or electrical means.

12. The system according to claim 1, wherein a plurality of frameworks of spaced bars that are parallel to or cross each other, are secured to respective rear portions of said solar array racking structures.

13. The system according to claim 1, wherein in the deployed position, said power system is braced against tipping forces by providing stabilizing jacks to each of said solar array support frames and each of said stabilizing jacks has a base that is raised up or lowered down to adjust to uneven terrain.

14. The system according to claim 1, further comprising a plurality of diagonal supports each secured at one end to a respective solar array support frames and at the other end secured to the respective side surfaces of said transportable platform.

15. The system according to claim 1 wherein said solar array racking structures and said solar arrays rotate remotely with incorporation of pneumatic, hydraulic or electrical means.

16. The system according to claim 1, further comprising a backup generator.

17. The system according to claim 1, wherein said solar arrays comprises concentrating photovoltaic systems.

18. The system according to claim 1, wherein said racking structure further comprises at least one horizontal hinge to allow said racking structure to horizontally fold around the horizontal axis of said at least one horizontal hinge.

19. A method of deploying a portable power system to a deployed position and restoring the portable power system to a storage position, comprising:

providing a transportable platform;

providing a plurality of solar array racking structures, each having a rear portion and front portion;

providing a plurality of solar panels, said solar panels being securely mounted upon said solar array racking structures thereby supporting said solar panels to form a plurality of planar solar arrays;

providing a plurality of substantially vertical, free-standing hinge posts, each respectively connected near the corners of said transportable platform;

providing a plurality of solar array support frames, each of said solar array support frames is vertically hinged to respective hinge post, wherein each of said respective solar array support frames is capable of rotating at various angles around the vertical axis of said respective hinge post;

providing a plurality of horizontal hinges, each horizontal hinge rotatably interconnected between said solar arrays and said plurality support frames respectively, each respective hinge capable of rotatably positioning said respective solar array at various angles;

providing at least one electrical component for receiving and processing in the deployment position electric energy generated by said plurality of solar arrays, said electric energy processed by said at least one electrical component for distributing electrical power to at least one external receptacle, wherein, in order to restore said system to storage position said system comprises the steps of:

rotating each of said solar arrays to a vertical position, rotating each of said respective solar array support frames about the vertical axis of their respective hinge posts toward the transportable platform and securing thereto for transportation, and wherein in order to deploy said system in the deployment position said system comprises the steps of:

unsecuring and rotating each of said respective solar array support frames to a desired angle; and rotating each of said respective solar arrays to a desired angle.

* * * * *